Nov. 11, 1969  C. C. CULVER  3,477,768
TRACTOR TRACK SHOE
Filed Nov. 22, 1967
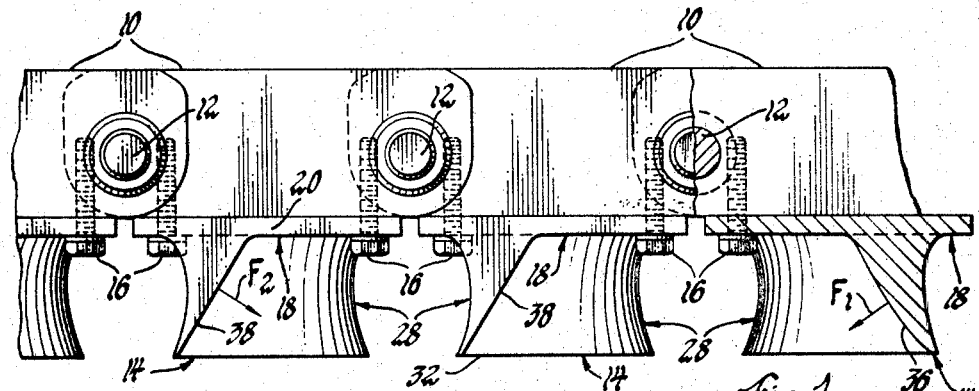
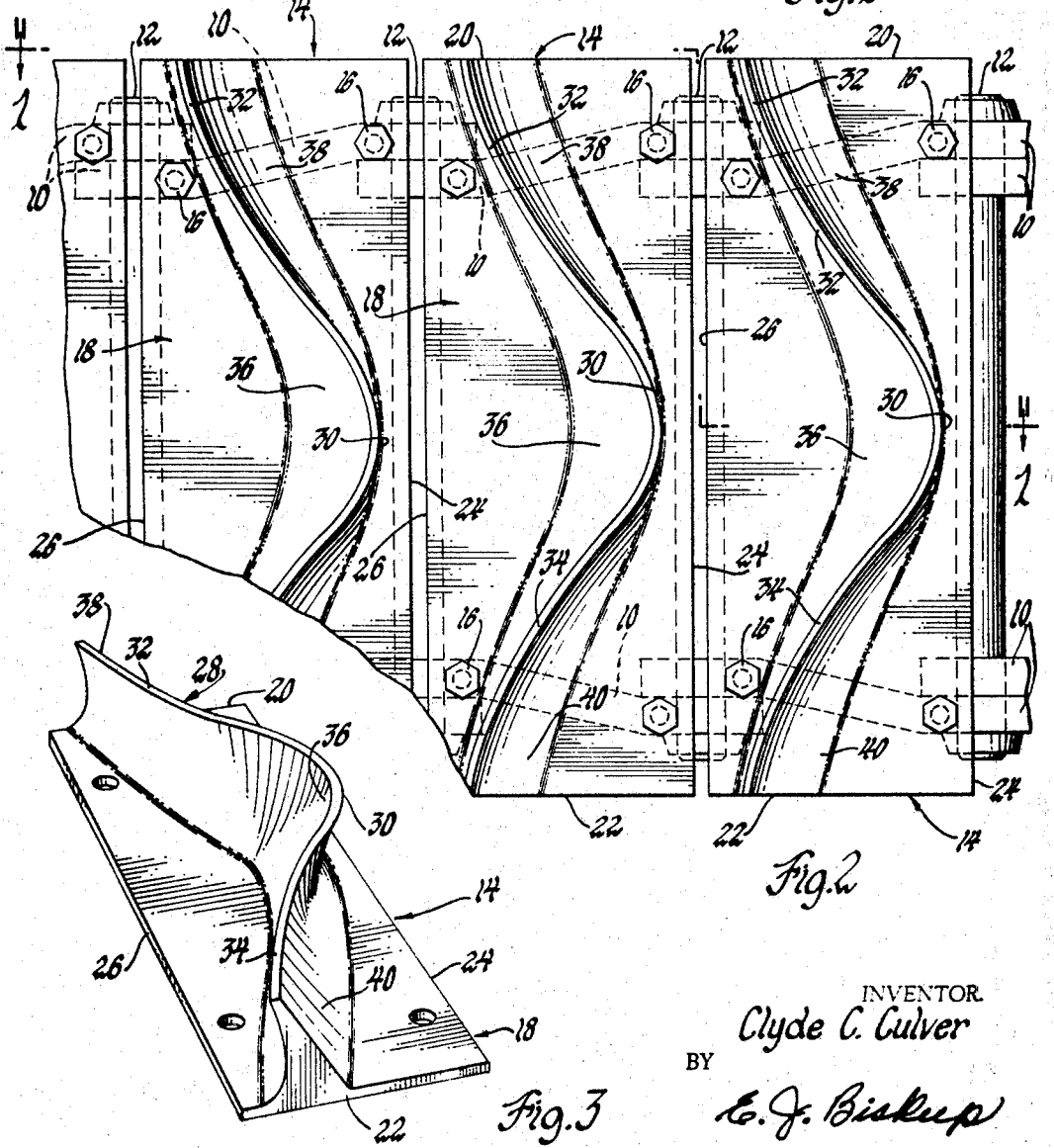
INVENTOR.
Clyde C. Culver
BY
E. J. Biskup
ATTORNEY United States Patent Office 3,477,768
Patented Nov. 11, 1969

3,477,768
TRACTOR TRACK SHOE
Clyde C. Culver, Bay Village, Ohio, assignor to General Motors Corporation, Detroit, Mich., a corporation of Delaware
Filed Nov. 22, 1967, Ser. No. 685,167
Int. Cl. B62d 55/26
U.S. Cl. 305—54                         1 Claim

ABSTRACT OF THE DISCLOSURE

A track shoe adapted to be secured to a pair of laterally spaced links of an endless track chain and having a substantially flat base plate from which a grouser projects outwardly therefrom. The grouser includes a central portion and a pair of laterally extending arms connected to the central portion. The central portion is located adjacent to the forward edge of the base plate and has a forwardly inclined ground-engaging surface. Each of the wings terminate adjacent to the rear edge of the plate and have a rearwardly inclined ground-engaging surface.

---

There are many forms of track shoes for the endless track chain of a crawler tractor. Most shoes are designed for specific applications, however, for general purpose use, the standard construction is a flat plate with a single transverse planar grouser projecting therefrom. Although this type of track shoe affords good traction under most conditions, it has been found that optimum traction is not attained when using the shoe in soft ground or under relatively heavy loads. In this connection, it is a recognized fact that when this track shoe is used in sand for pulling a load that is relatively large, the tracks will tend to spin causing the tractor to dig itself into the material and lose complete mobility. It is believed that one reason for this difficulty can be attributed to the relatively shallow shear pattern created in the soil by the ground reaction surface of the planar grouser, hence resulting in relatively little gripping action for propelling the tractor. Apart from this difficulty, another drawback of the planar-type grouser is that it has been found to be relatively ineffective for preventing side-slip when a tractor is operating on a bank made up of soil of the type under consideration.

The present invention is directed toward alleviating the above problems by providing a general purpose type track shoe that is designed so as to realize maximum tractive efficiency in all materials and particularly in low friction materials such as soft or sandy ground. Accordingly, among the objects of the present invention is to provide a track shoe having a grouser that creates a relatively deep shear pattern when it engages the ground so as to give increased traction in low friction soils; to provide a track shoe having portions of the grouser located in inclined planes so that it compacts the material and establishes a ground-engaging force that acts downwardly and opposite to the direction of tractor travel; to provide a contoured grouser for a track shoe that resists side-slip when the tractor is on a bank; and to provide a grouser for a track shoe that has oppositely inclined ground-engaging surfaces formed thereon that serve to compress the ground and create deep shear patterns while the tractor is moving forwardly or rearwardly.

Other objects and advantages of the present invention will be more apparent from the following detailed description when taken with the drawing in which:

FIGURE 1 is an elevation view of a part of a track chain employing track shoes made in accordances with the invention and taken on line 1—1 of FIGURE 2;

FIGURE 2 is a plan view of the track shoes illustrated in FIGURE 1, and

FIGURE 3 is a perspective view of one of the track shoes shown in FIGURES 1 and 2.

Referring to the drawing and more particularly FIGURES 1 and 2 thereof, a portion of a track chain is shown consisting of a plurality of identically formed and laterally spaced links 10 interconnected by transversely extending pins 12 which provide hinged connections permitting the chain to articulate as it moves about the usual idler wheel and drive sprocket of a crawler tractor of the type shown in U.S. Patent No. 3,096,840 in the name of Janis Mazzarins and assigned to the assignee of this invention.

Each pair of laterally aligned links 10 supports a track shoe 14 made according to the invention and fastened to the links by a plurality of spaced bolts 16. The track shoes 14 are identical in construction and, accordingly, only one of such shoes shall be described, it being understood that corresponding parts thereof on other track shoes shall be identified by corresponding numerals.

As seen in FIGURE 2, the track shoe 14 comprises a rectangularly shaped flat plate portion 18 defined by laterally spaced side edges 20, 22 and a front edge 24 and rear edge 26. A grouser 28 projects outwardly from the plate portion 18 and includes an arcuately shaped central or apex portion 30 integrally formed with a pair of laterally extending arms or wings 32 and 34 which respectively terminate at the side edges 20 and 22 adjacent the rear edge 26. The grouser 28 has a generally V-shape in a plan view and can be said to have oppositely disposed surfaces generated generally in a helical path with the central portion 30 of the grouser including a ground reaction surface 36 that is inclined forwardly and faces the rear edge 26 as seen in FIGURE 1. Similarly, the arms 32 and 34 are provided with ground-reaction surfaces 38 and 40, respectively, each of which is formed so as to be inclined rearwardly and face the forward edge 24 of the plate portion 18. The direction of inclination of the ground-engaging surfaces can be seen best in FIGURES 1 and 3.

The particular configuration of the grouser 28 described above is important in that by inclining the ground-reaction surfaces as explained, an increased shear pattern is realized when the track shoe is operating in soft or sandy materials. For example, as seen in FIGURE 1, assuming the grousers 28 are embedded in the soil and the track chain is propelling a tractor moving in a direction toward the right edge of the drawing sheet so that the track chain is traveling toward the left edge of the sheet, under such conditions, the tractive force produced by the ground-reaction surface 36 has a force component $F_1$ acting against the soil in a direction normal to the surface 36. The force component acts downwardly and in a direction opposite to tractor movement so that the soil beneath the central portion 30 of the grouser is compressed to establish a shear pattern in the soil that will be relatively deep so that increased traction of the tractor is realized. Should the tractor now reverse its direction of travel, the track chain, of course, would then move towards the right edge of the drawing sheet at which time the ground-reaction surfaces 38 and 40 of the respective arms 32 and 34 will now provide a force component $F_2$ which is normal to the associated surface and acts downwardly and similarly establishes a relatively deep shear pattern in the soil for improving the tractive effort of the tractor.

Besides increasing the tractive efficiency of a crawler tractor, the track shoe 14 having the unique grouser 28 described above also serves to limit side-slip of a tractor when the latter is operating on a bank. This occurs because of the generally V-shaped footprint which is established when the grouser penetrates the soil. Thus, the tendency for the grouser to cut laterally through the soft soil is prevented since the V-form tends to trap and hold soil within the central or apex portion 30 and thereby materially reduce side-slipping.

Various changes and modifications can be made in this construction without departing from the spirit of the invention.

I claim:
1. A track shoe adapted to be secured to a pair of laterally spaced links of an endless track chain, said track shoe comprising a substantially flat base plate having front and rear edges and a pair of laterally spaced side edges, a grouser rigid with said base plate and extending between said side edges, said grouser having an arcuately-shaped central portion located adjacent to the front edge of the base plate, a pair of arms extending rearwardly from the central portion and terminating adjacent to the rear edge of the base plate, the forwardly facing surface of each of said arms being inclined rearwardy from the base plate and merging with the forwardly facing surface of the central portion, the rearwardly facing surface of the central portion being inclined forwardly and merging with the rearwardly facing surface of said arms, said forwardly inclined surface of the central portion and the rearwardly inclined surfaces on said arms adapted to compress material beneath the grouser, said forwardly facing surfaces and the rearwardly facing surfaces on the central portion and the arms each being continuously curved and being generated in a generally helical path.

References Cited

UNITED STATES PATENTS

| | | | |
|---|---|---|---|
| 1,304,357 | 5/1919 | Norelius | 305—54 |
| 1,630,089 | 5/1927 | Leake | 305—54 X |
| 2,404,493 | 7/1946 | Hait | 305—54 X |
| 3,278,244 | 10/1966 | Deffenbaugh | 305—54 |

RICHARD J. JOHNSON, Primary Examiner